US012586720B2

(12) United States Patent
Kako

(10) Patent No.: US 12,586,720 B2
(45) Date of Patent: Mar. 24, 2026

(54) CAPACITOR AND METHOD FOR MANUFACTURING SAME

(71) Applicant: Rubycon Corporation, Nagano (JP)

(72) Inventor: Tomonao Kako, Nagano (JP)

(73) Assignee: Rubycon Corporation, Nagano (JP)

( * ) Notice: Subject to any disclaimer, the term of this patent is extended or adjusted under 35 U.S.C. 154(b) by 79 days.

(21) Appl. No.: 18/682,096

(22) PCT Filed: Aug. 10, 2021

(86) PCT No.: PCT/JP2021/029470
§ 371 (c)(1),
(2) Date: Feb. 7, 2024

(87) PCT Pub. No.: WO2023/017556
PCT Pub. Date: Feb. 16, 2023

(65) Prior Publication Data
US 2024/0412923 A1 Dec. 12, 2024

(51) Int. Cl.
*H01G 4/012* (2006.01)
*H01G 4/008* (2006.01)
*H01G 4/30* (2006.01)

(52) U.S. Cl.
CPC ........... *H01G 4/012* (2013.01); *H01G 4/0085* (2013.01); *H01G 4/30* (2013.01)

(58) Field of Classification Search
CPC ......... H01G 4/012; H01G 4/0085; H01G 4/30
See application file for complete search history.

(56) References Cited

U.S. PATENT DOCUMENTS

| | | | |
|---|---|---|---|
| 2001/0020754 A1 | 9/2001 | Honda et al. | |
| 2010/0008017 A1* | 1/2010 | Ito | H01G 4/30 |
| | | | 361/301.4 |
| 2013/0050895 A1 | 2/2013 | Tezuka et al. | |
| 2015/0138691 A1 | 5/2015 | Takeoka et al. | |
| 2016/0196917 A1* | 7/2016 | Lim | H01G 4/012 |
| | | | 361/301.4 |
| 2016/0284472 A1 | 9/2016 | Yializis | |
| 2017/0125167 A1* | 5/2017 | Kawakami | H01G 4/236 |
| 2018/0061577 A1* | 3/2018 | Yasuda | H01G 4/0085 |

(Continued)

FOREIGN PATENT DOCUMENTS

| | | |
|---|---|---|
| JP | 596519 A | 1/1984 |
| JP | 11186097 A | 7/1999 |

(Continued)

OTHER PUBLICATIONS

International Preliminary Report on Patentability for PCT/JP2021/029470 issued Feb. 13, 2024, 6 pages.

(Continued)

*Primary Examiner* — Michael P McFadden
(74) *Attorney, Agent, or Firm* — BLANK ROME LLP

(57) ABSTRACT
A capacitor (1) includes a main body (10) in which a dielectric layer (13) and an electrode layer (11) are laminated, and an external electrode (20) connected to at least a part of the main body. The electrode layer (11) includes a heavy edge portion (16) with a connecting part (18), which connects to the external electrode and is thicker than an internal electrode part (15). The capacitor (1) further includes an edge support layer (12) that is made of metal and is laminated on the heavy edge portion (16).

23 Claims, 5 Drawing Sheets

(56) References Cited

U.S. PATENT DOCUMENTS

| | | | | |
|---|---|---|---|---|
| 2018/0090277 | A1* | 3/2018 | Kikuchi | ................. H02P 27/06 |
| 2020/0335283 | A1 | 10/2020 | Ozasa et al. | |
| 2023/0170151 | A1 | 6/2023 | Kako et al. | |

FOREIGN PATENT DOCUMENTS

| | | | | |
|---|---|---|---|---|
| JP | 2003257783 | A | | 9/2003 |
| JP | 201186802 | A | | 4/2011 |
| JP | 2013247207 | A | | 12/2013 |
| JP | 2020-519003 | A | | 6/2020 |
| JP | 2021-19133 | A | | 2/2021 |
| JP | 2021019133 | A | * | 2/2021 |
| WO | 2013179612 | A1 | | 12/2013 |
| WO | 2016152800 | A1 | | 9/2016 |
| WO | 2019150839 | A1 | | 8/2019 |

OTHER PUBLICATIONS

English Language Translation of the Written Opinion of the International Search Authority of PCT/JP2021/029470 mailed Nov. 2, 2021, 5 pages.
International Search Report and Written Opinion for PCT/JP2021/029470, mailed Nov. 2, 2021, 10 pages.
International Search Report for PCT/JP2022/029625 mailed Nov. 1, 2022, 5 pages.

* cited by examiner (a)

(b)

(a)

(b)

CAPACITOR AND METHOD FOR MANUFACTURING SAME

RELATED APPLICATIONS

This application is a national phase of PCT/JP2021/029470, filed on Aug. 10, 2021. The contents of this application is hereby incorporated by reference in its entirety.

TECHNICAL FIELD

The present invention relates to a capacitor and a method for manufacturing the same.

BACKGROUND ART

A polymer multi-thin-layer capacitor described in Japanese Laid-open Patent Publication No. 2021-19133 includes: a chip-shaped multilayered body (laminated product) in which dielectric layers and internal electrode layers, which include a first metal layer formed by vapor deposition of a first metal on a dielectric layer and a second metal layer formed by vapor deposition of a second metal on the first metal layer, are alternately stacked and bonded together; and external electrodes respectively formed at one end and another end of the multilayered body. The multilayered body includes a first region, where dielectric layers on which the first metal is formed are alternately stacked, and edge regions, where the second metal is formed on parts of the first metal layers that are connected to the one end and the other end and are alternately stacked. The first region includes a region that functions as a capacitor and the edge regions are formed with heavy edges.

SUMMARY OF INVENTION

In the field of film capacitors, there is a known "heavy edge structure", where the internal electrodes that form the capacitance are thinly formed to improve self-healing, and electrode parts that are connected to external electrodes provided on both end faces have increased thickness. For polymer multi-thin-layer capacitors including a multilayered body with dielectric layers made of resin and electrode layers also, the use of heavy edge structures to achieve favorable connectivity with the external electrodes and favorable withstand voltage characteristics and also achieve the desired capacitance is known.

In recent years, there has been demand for capacitors with even higher withstand voltages and lower ESR (Equivalent Series Resistance). When a heavy edge structure is used, if, to increase the withstand voltage, the electrode parts (that is, the internal electrode parts) of the capacitor part are made thinner so that the surface resistivity (sheet resistivity) is sufficiently raised, the connecting parts will also become thinner. For this reason, the connection resistance of the connecting parts will also be high, which makes it difficult to sufficiently reduce the ESR. On the other hand, if only the edge parts are made thicker, the difference in thickness from the internal electrode parts formed as thin layers will be too large, which makes it difficult to provide a capacitor with stable performance at low cost.

A capacitor according to an aspect of the present disclosure includes a main body in which a dielectric layer and an electrode layer are laminated, and an external electrode connected to at least a part of the main body. The electrode layer includes an internal electrode part and a heavy edge portion. The heavy edge portion (heavy edge part, heavy edge region) includes a connecting part, which connects to the external electrode and is thicker than the internal electrode part. The capacitor further includes an edge support layer includes at least one layer that is made of metal and laminated (stacked, covered) on at least one of a top and a bottom of the heavy edge portion.

When an internal electrode part that has been thinly formed and a heavy edge portion that is relatively thick are simultaneously manufactured by a method, such as vapor deposition, coating, or printing, manufacturing problems may occur due to differences in stacking amounts to the different parts or the like. As one example, it is not easy to manufacture, at the same time as the manufacturing of an internal electrode part in the form of a thin layer, a heavy edge portion whose thickness may be several times larger than the internal electrode part. The capacitor according to the present invention includes, in addition to an electrode layer provided with a heavy edge portion that is formed at the same time as the internal electrode part and is integrated with the internal electrode part, an edge support layer with a metal layer laminated (stacked) on at least one of the top and bottom of the heavy edge portion. The heavy edge portion can be manufactured with the same conditions as the thin internal electrode part and in a range where there is little burden on the manufacturing process. The edge support layer also enables the edge portion to be made thicker using a different metal and/or method from the electrode layer. This means that it is possible to efficiently manufacture a capacitor including an edge portion that is several times thicker or more than the thin internal electrode part. By stacking the heavy edge portion and the edge support portion, it is possible to achieve a desired cross-sectional area for the edge portion, which makes it possible to provide a capacitor with the desired connection performance at low cost.

The electrode layer may include a first metal and the edge support layer may include a second metal with a lower melting point and/or boiling point than the first metal. If these layers are formed by vapor deposition or coating, it is possible to manufacture the edge support layer at even lower cost by using a metal with a lower boiling point or melting point at the edge support layer. The first metal and the second metal may include at least one of aluminum, zinc, copper, gold, silver, and an alloy containing any of aluminum, zinc, copper, gold, and silver. The first metal may include aluminum or an alloy of aluminum and the second metal may include zinc or an alloy of zinc. The electrode layer may be a vapor deposition layer (a layer produced by vapor deposition) of the first metal on the dielectric layer and the edge support layer may be a vapor deposition layer (a layer produced by vapor deposition) of the second metal on the heavy edge portion. The main body may include a part where: a resin vapor deposition layer forming the dielectric layer; a vapor deposition layer of the first metal that constructs the electrode layer; and a vapor deposition layer of the second metal that constructs the edge support layer, are repeatedly laminated or stacked in that order.

The dielectric layer may include thermosetting resin and the dielectric layer may have a thickness of 0.1 μm to 1.5 μm. The internal electrode part in the form of a thin layer may have a surface resistivity of 5 Ω/square to 80 Ω/square. The combined surface resistivity of the heavy edge portion and the edge support layer where the thickness is increased may be 1 Ω/square to 20 Ω/square. The electrode layer may include the heavy edge portion that is separated from the internal electrode part, and the edge support layer may include a layer that is laminated on at least one of a top and a bottom of the dummy heavy edge portion which has been separated. The capacitor may include a plurality of the edge support layers.

Another aspect of the present disclosure is a method for manufacturing a capacitor including a main body in which dielectric layers and electrode layers are alternately laminated, wherein at least part of the main body is connected to an external electrode. The method includes the steps described below.

1. Forming an electrode layer on a dielectric layer that has been deposited or is in the form of a film, and forming heavy edge portions with connecting parts that connect to the external electrode and are thicker than an internal electrode part.

2. Depositing an edge support layer including at least one layer on the heavy edge portions.

One example method of forming a layer is vapor deposition, and the forming of the dielectric layer may include vapor deposition of a resin material that constructs the dielectric layer in a reduced pressure environment, the forming of the electrode layer may include vapor deposition of a first metal, which constructs the electrode layer, on the dielectric layer, and the forming of the edge support layer may include vapor deposition of a second metal. The method for manufacturing may include curing the resin material, which is thermosetting, following the vapor deposition of the resin material. The vapor deposition of the first metal may include vapor deposition using a metal mask in a first pattern, and the vapor deposition of the second metal may include vapor deposition using a metal mask in a second pattern that differs from the first pattern. It is possible to form the edge support layer using a different metal and/or method from the electrode layer.

This method for manufacturing a capacitor may further include patterning a margin, which separates one of heavy edge portions from the inner electrode part, on the dielectric layer before the forming of the electrode layer. The forming of the edge support layer may include forming the at least one layer on each of the heavy edge portions, one that is separated by the margin and the other that is not separated by the margin.

Another aspect of the present disclosure is a system (apparatus) for manufacturing a capacitor which includes a main body, in which dielectric layers and electrode layers are alternately laminated, wherein at least part of the main body is connected to an external electrode. The system includes: a chamber that provides a reduced pressure environment; a transferring device that transfers workpiece for the main body during manufacturing inside the chamber; a dielectric layer forming device that forms a dielectric layer on the workpieces; an electrode layer forming device that forms an electrode layer on the dielectric layer together with heavy edge portions with connecting parts that connect to the external electrode and are thicker than an internal electrode part; and at least one edge support layer forming device that forms an edge support layer on the heavy edge portions. The dielectric layer forming device, the electrode layer forming device and the edge support layer forming device(s) are disposed along the transferring device inside the chamber. Accordingly, in this manufacturing device, the dielectric layer, the electrode layer, and the edge support layer are consecutively laminated in a reduced pressure environment.

The dielectric layer forming device may include a device that performs vapor deposition of a resin material that constructs the dielectric layer in the reduced pressure environment, the electrode layer forming device may include a device that performs vapor deposition of a first metal, which constructs the electrode layer, on the dielectric layer in the reduced-pressure environment, and the edge support layer forming device may include a device that performs vapor deposition of a second metal in the reduced pressure environment. This system may further include a device that is disposed along the transferring device inside the chamber and cures the resin material, which is thermosetting. The device that performs vapor deposition of the first metal may include a metal mask with a first pattern, and the device that performs vapor deposition of the second metal may include a metal mask with a second pattern that differs from the first pattern. The system may further include a patterning device, disposed between the dielectric layer forming device and the electrode layer forming device along the transferring device inside the chamber, that performs patterning on the dielectric layer to form a margin, which separates one of the heavy edge portions from the internal electrode part. The system may also include a plurality of the edge support layer forming devices.

DESCRIPTION OF EMBODIMENTS

Figure 1:
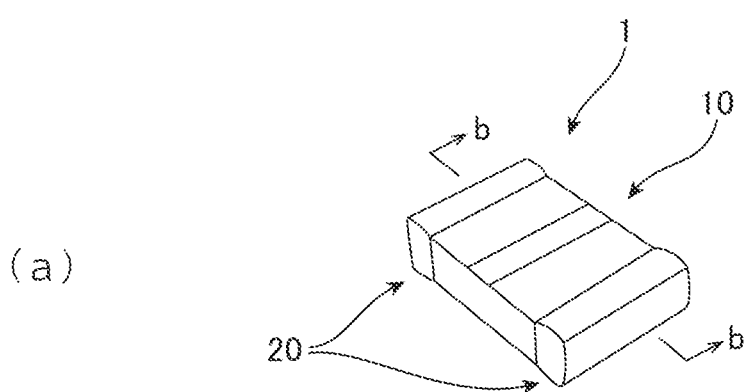
FIG. 1 depicts an overview of a capacitor.
Figure 1:
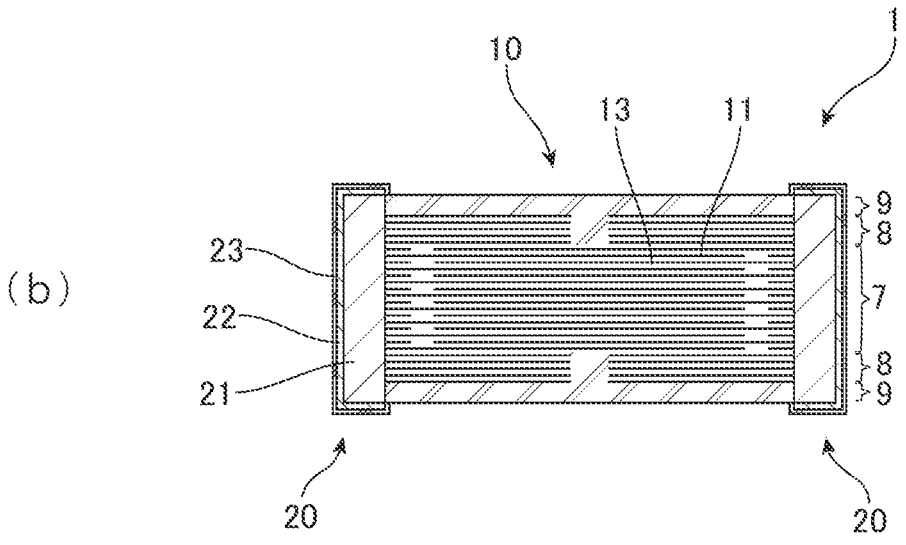

FIG. 1 depicts one example of a capacitor (condenser) according to the present invention. As a capacitor 1, which includes a main body (capacitor element, capacitor core, core, body, laminated body, multilayered body or multilayer product) 10 in which dielectric layers and electrode layers are alternatively laminated (stacked) and integrated, and external electrodes 20 connected to the main body 10, ceramic capacitors, film capacitors (for example, metallized film capacitors), polymer multi-thin-layer capacitors (thin-film polymer multilayer capacitors), and the like are known. The capacitor 1, whose external appearance is depicted in FIG. 1(*a*), is one example of a polymer multi-thin-layer capacitor (Polymer Multi-Layer CAPacitor). As depicted in the cross-sectional view given in FIG. 1(*b*), the main body 10 includes active layers (bulk of active layers, core layers, or active region) 7, which are provided at the center in the thickness direction and provide the capacitance, dummy layers (dummy bulk layers or dummy regions) 8 that are disposed above and below the active layers and do not provide capacitance, and protective layers (protective regions) 9 disposed above and below the dummy layers 8. The active layers 7 and the dummy layers 8 are constructed by stacking resin layers (dielectric layers) 13 and electrode layers 11, and the protective layers 9 are composed of only resin layers. The external electrodes 20 are formed so as to be bonded to the electrode layers 11 and the resin layers 13 in the active layers 7 and the dummy layers 8, and each include an internal metallikon (metallized, metallic sprayed) layer (layer formed by metallic spray, metallikon connecting region, as one example, brass metallikon) 21, a copper plating layer 22 for covering the periphery of the internal metallikon layer 21, and a tin plating layer 23 for further covering the outside.

Figure 2:
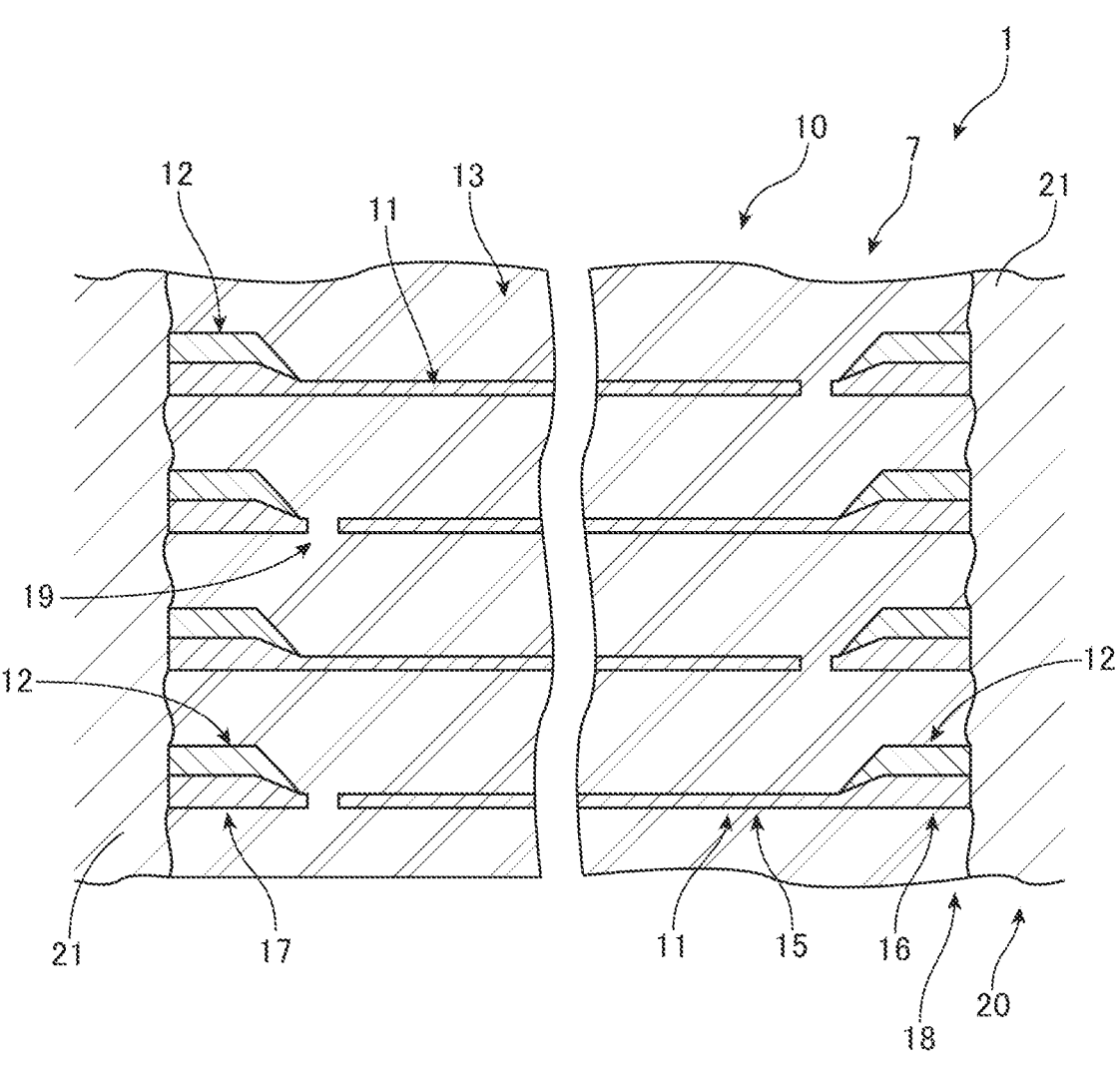
FIG. 2 is a cross-sectional view depicting an overview of active layers (multilayered body).

FIG. 2 depicts an enlarged cross section of a part of the active layers 7 of the main body 10. The active layers 7 of the main body 10 are a part where the dielectric layers 13 and the electrode layers 11 are alternatively stacked (laminated). End portions (side surfaces or edge portions) 18 of the dielectric layers 13 and the electrode layers 11 are bonded to the metallikon layer 21 of each external electrode 20, with the electrode layers 11 also being electrically connected to the metallikon layers 21. The electrode layers 11 each include a thin-layer (thin-film) internal electrode part 15, which is in wide contact with dielectric layers 13 inside the active layers 7 and forms a capacitance, and heavy edge portions (heavy edge parts) 16 that include end portions (connecting parts) 18 that are connected to the external electrodes 20 (the metallikon layers 21) and thicker than the internal electrode part (internal electrode portion) 15. The active layers 7 further include edge support layers 12 with metal that are laminated (stacked) on the heavy edge portions 16 respectively.

One example of the resin forming the dielectric layers 13 is a thermosetting resin, including acrylic polymer. One example of a resin that can be used in the polymer multi-thin-layer capacitor (thin-film polymer multilayer capacitor) 1 is a polymer obtained by polymerizing one or more of tricyclodecane dimethanol dimethacrylate and tricyclodecane dimethanol diacrylate, but the resin that constructs the dielectric layers 13 is not limited to these. To provide a small, thin, and high-capacity capacitor, it is possible to make the dielectric layers 13 sufficiently thin and laminate a sufficient number of the dielectric layers 13. As examples, the thickness of each of the dielectric layers 13 may be 0.1 to 1.5 μm, or 0.2 to 1.2 μm, and the number of layers may be 1000 or higher. Thin dielectric layers 13, each of which has a predetermined thickness can be obtained by vapor deposition of a thermosetting resin as a monomer in a reduced pressure environment (that is, in a vacuum) and curing the resin by irradiation with an electron beam or the like. A capacitor 1 with dielectric layers 13 made of thermosetting resin has a higher withstand temperature than a capacitor made of a thermoplastic resin, is compatible with or applicable to reflowing, and can therefore be provided as an element that is more suited to surface mounting.

The electrode layers 11 may be formed of conductive metal, for example at least one of aluminum, zinc, copper, gold, silver, and an alloy containing any of these metals. As a capacitor 1 for high-voltage applications, the withstand voltage can be improved by reducing the thickness of each of the electrodes that function as a capacitor, that is, each of the internal electrode portions 15. As one example, the withstand voltage may be 400V or higher, and the thickness of each internal electrode portion 15 may be around 1 to 300 nm, or around 3 to 100 nm. Surface resistivity may be used, and the surface resistivity of each internal electrode portion 15 may be 5 to 80 Ω/square (Ω/sq.), 15 to 80 Ω/sq., or 20 to 80 Ω/sq.

When the electrode layers 11 are made thinner, the withstand voltage can be increased, but the loss factor (tan δ) and the equivalent series resistance (ESR) increase, so that the performance as a capacitor tends to decrease. For this reason, the electrode layers 11 each include heavy edge portions (heavy edges) 16 where the connecting parts 18 that connect to the external electrodes 20 are thicker than the internal electrode portion 15. Even if the internal electrode part 15 is thin, by making the connecting parts 18 that connect to the external electrodes 20, in the present embodiment, to the metallikon 21 sufficiently thick, it is possible to lower the tan δ and the ESR, to improve the frequency characteristics, and to produce a capacitor compatible with or applicable to large currents.

In addition, the capacitor 1 according to the present embodiment includes the edge support layers 12 that are formed over the heavy edge portions 16, and at the connecting parts 18 that connect to the metallikon 21, the heavy edge portion 16 and the edge support layer 12 are integrated. With this structure, that is, the heavy edge portion 16 and the edge support layer 12 acting together, it is possible to control the electrical and mechanical bonds with the metallikon 21 that forms the external electrodes. The total thickness of a heavy edge portion 16 and an edge support layer 12 is thicker than an internal electrode portion 15, and may be 15 to 200 nm, or 30 to 100 nm. The combined surface resistivity of the heavy edge portion 16 and the edge support layer 12 may be 1 to 20 Ω/sq., 2 to 15 Ω/sq., or 3 to 10 Ω/sq.

In this capacitor 1, the thin film-like internal electrode parts (internal electrode layers) 15 and the thicker heavy edge portions 16 are continuously formed as the electrode layers 11 in the same process using the same metal, such as aluminum. Accordingly, there is no boundary between a heavy edge portion 16 and an internal electrode part 15, the heavy edge portion 16 and the internal electrode part 15 are electrically and mechanically integrated, and it is possible to prevent an increase in resistance and/or a decrease in strength due to boundaries existing between the heavy edge portions 16 and the internal electrode parts 15.

On the other hand, by additionally providing the edge support layers 12 afterward, it is possible to achieve the desired thickness for the connecting parts that connect to the external electrodes, which means that the thickness of the heavy edge portions 16 that are integrally formed with the internal electrode parts 15 can be set to a thickness that can be formed without difficulty with the same conditions and process as the internal electrode parts 15. It is therefore possible to prevent a drop in manufacturing speed and manufacturing becoming time consuming due to the formation of the heavy edge portions 16 and difficulty in controlling the shape and thickness of the internal electrode parts 15 and/or the heavy edge portions 16.

The edge support layers 12 that are laminated on the heavy edge portions 16 of the electrode layers 11 can be deposited at different timing and in a different process from the electrode layers 11. Accordingly, the edge support layers 12 may be made of the same material as the electrode layers 11 or may be made of a different material, and the formation conditions may be changed so that the edge support layers 12 are formed with conditions that prioritize formation cost and time. Examples of the first metal that constructs the electrode layers 11 include aluminum and/or an alloy of aluminum, and the second metal that constructs the edge support layers 12 may include zinc and/or an alloy of zinc.

As one example, the second metal that constructs the edge support layers 12 may have a lower melting point and/or boiling point than the first metal that constructs the electrode layers 11. A metal with a low melting point can be deposited at a lower cost compared to when the layer is formed by coating or the like. In addition, when the layer is formed by vapor deposition or the like, use of a metal with a low boiling point can reduce the price and running cost of the layer-forming device and can improve production efficiency by raising the manufacturing speed. In addition, at the connecting parts 18 that connect to the external electrodes, since the electrical and mechanical performance (features)

of the internal electrode parts 15 that function as a capacitor can be covered comparatively easily to an extent by the heavy edge portions 16 formed in the same process as the internal electrode parts 15, as the second metal constructing the edge support layers 12, it is possible to preferentially set cost of forming the layers, bonding conditions with the metallikon 21, and the like. In addition, since the edge support layers 12 are formed on the heavy edge portions 16 that already have a certain thickness, there is no need to make the edge support layers 12 excessively thick, it is possible to control the thickness of the edge support layers 12 to within or around the areas (surfaces) of the heavy edge portions 16 and to suppress the influence on the internal electrode portions 15 due to increasing the thickened area of the edge portions 18.

One example of the capacitor 1 is a configuration where each of the electrode layers 11 is a layer produced by vapor deposition of the first metal on each of the dielectric layers 13 and each of the edge support layers 12 is a layer produced by vapor deposition of a second metal on each of the heavy edge portions 16. Accordingly, the main body 10 may include a multi-layer part (the "active layers") 7 where resin vapor deposition layer that form the dielectric layer 13, vapor deposition layer of the first metal that construct the electrode layer 11, and vapor deposition layer of the second metal that construct the edge support layer 12 are repeatedly laminated or stacked in that order.

The electrode layers 11 of the capacitor 1 further include dummy heavy edge portions 17 that are separated from the internal electrode parts 15 by gaps 19, with the edge support layers 12 also being laminated on these separated dummy heavy edge portions 17 respectively. Since each dummy heavy edge portion 17 is separated from an internal electrode part 15, it does not contribute to the capacitance of the capacitor 1. However, such dummy heavy edge portions 17 are useful in achieving mechanically strong connections with the metallikon 21 of the external electrodes 20 and maintain or strengthen the connections between the metallikon 21 in cooperation with the heavy edge portions 16, which are integrated with the internal electrode parts 15. Accordingly, by providing the dummy heavy edge portions 17 and the edge support layers 12 that are formed on the dummy heavy edge portions 17, it is possible to further reduce the tan δ and the ESR of the capacitor 1, which makes it possible to provide a capacitor that has favorable frequency characteristics and can handle a large current. Note that although the edge support layers 12 include layers that are laminated on the tops of the heavy edge portions 16 and 17 in the present embodiment, it is also possible to form the edge support layers 12 that include layers on the bottoms or on layers on both the tops and the bottoms.

Figure 3:
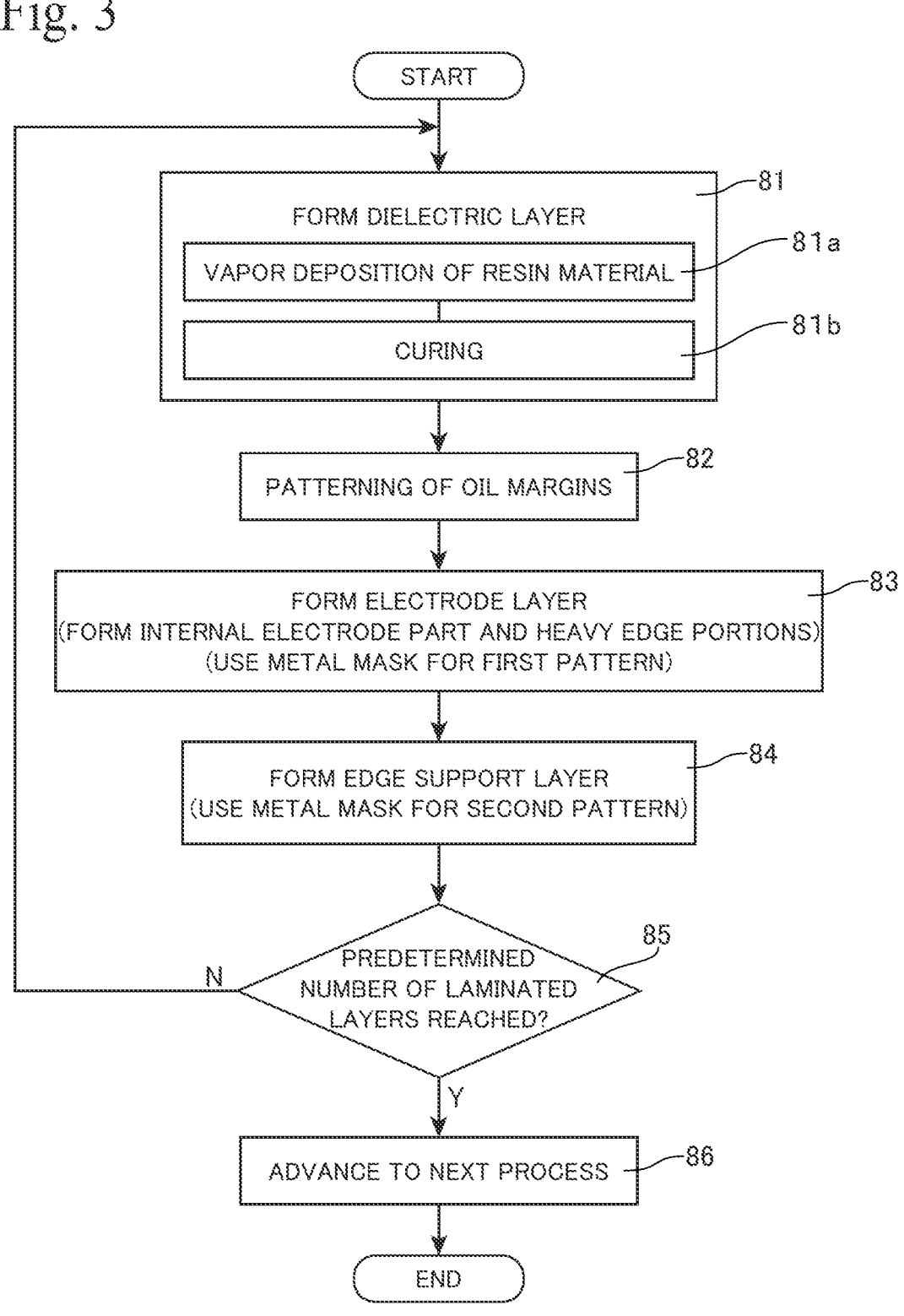
FIG. 3 is a flowchart depicting an overview of a method for manufacturing a capacitor.
Figure 4:
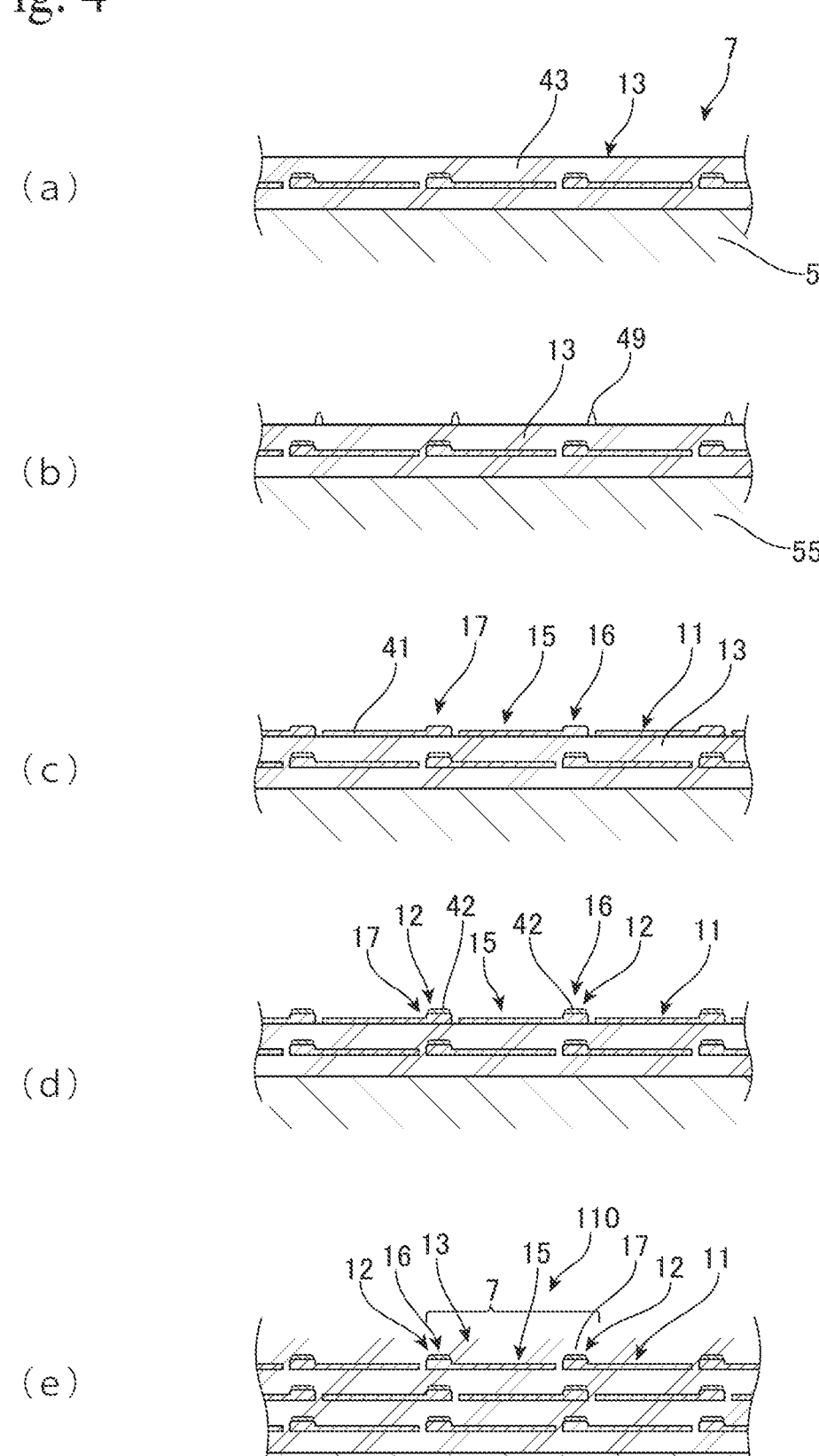
FIG. 4 depicts one example of a manufacturing process of the active layers.
Figure 5:
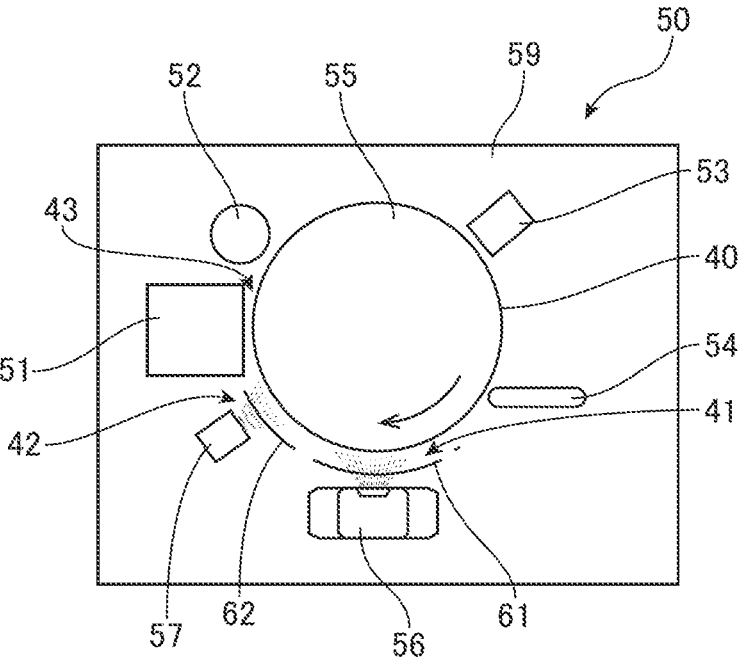
FIG. 5 depicts one example of a layer film forming system.

FIG. 3 is a flowchart depicting one example of a process for manufacturing the active layers 7, which is the multi layered part of the main body 10 of the capacitor 1 according to the present embodiment, using a system for forming layers (layer film forming system, layer film deposition system, film forming apparatus, film forming system), with FIG. 4 schematically depicting how the respective layers are laminated or stacked. FIG. 5 depicts an overview of a layer film forming system (layer film forming apparatus) 50 used as a system for manufacturing the capacitor 1. The layer film forming system 50 includes a vacuum chamber 59 and a drum 55 that rotates in a reduced pressure environment (vacuum environment) inside the vacuum chamber 59 and conveys (transfers, moves) a workpiece 40 for manufacturing the main body 10. Note that although an example where the drum 55 is used as a transferring device (moving unit, conveying device, conveyer or feeder) and the workpiece 40 is continuously formed on the drum 55 and conveyed is illustrated in the present embodiment, it is also possible to intermittently convey or transfer a plurality of workpieces 40 with the drum 55. The layer film forming system 50, which is a manufacturing device (manufacturing system) that uses vapor deposition, further includes a dielectric layer forming unit (dielectric layer forming device) 51 for forming the dielectric layers 13 on the workpiece 40, an electrode layer forming unit (electrode layer forming device) 56 for forming the electrode layers 11 on top of the dielectric layers 13 respectively together with the heavy edge portions 16 where the connecting parts 18 that connect to the external electrodes 20 are thicker than the internal electrode parts 15, and an edge support layer forming unit (edge support layer forming device) 57 for forming the edge support layers 12 on the heavy edge portions 16 respectively. The dielectric layer forming device 51, the electrode layer forming device 56, and the edge support layer forming device 57 are disposed around the drum 55, which is a transferring device for conveying or transferring the workpiece 40 for the main bodies 10 being manufactured inside the chamber 59, which provides a reduced pressure environment. Accordingly, in the film forming system 50, a dielectric layer 13, an electrode layer 11, and an edge support layer 12 are consecutively laminated in a reduced pressure environment. The layer film forming system 50 may include a plurality of edge support layer forming devices 57 and may manufacture a capacitor including a plurality of edge support layers 12 for each heavy edge portion.

The layer film forming system 50 further includes a patterning unit (patterning device) 54, which is disposed inside the chamber 59 between the dielectric layer forming device 51 and the electrode layer forming device 56 along the drum 55 and performs patterning to form a margin on each dielectric layer 13 to separate one of the heavy edge portions 16 from the internal electrode part 15. In more detail, the layer film forming system 50 includes, in order around the rotating drum 55, a monomer vapor deposition unit (monomer vapor deposition device) 51 for vapor deposition of a resin material 43 as a dielectric film forming device, an electron beam irradiation device 52, a plasma processing device 53, a patterning device 54, a first vapor deposition unit (first vapor deposition device) 56 for vapor deposition of a first metal 41 as the electrode layer forming device, and a second vapor deposition unit (second vapor deposition device) 57 for vapor deposition of a second metal 42 as the edge support layer forming device.

Although the present invention is described below by way of an example where the active layers 7, which are the multi-layer part (laminated part), are manufactured by vapor deposition, layers may be formed or applied by another method, such as coating or printing, and when a layer has already been manufactured as a dielectric film, such as in a film capacitor, the process of forming the dielectric layers may be omitted and may be performed separately to the step of forming the electrode layers.

First, in step 81, the dielectric layer 13 is formed. In more detail, as depicted in FIG. 4(*a*), thermosetting resin 43 for forming a dielectric layer 13 is applied (layered, deposited) by vapor deposition by the monomer vapor deposition device 51 on lower layers that have been stacked on the drum 55. The deposited thermosetting resin 43 is cured by the electron beam irradiation device 52 to form a dielectric layer 13, and the surface of this dielectric layer 13 is subjected to plasma treatment by the plasma processing device 53 in readiness for the next process. Accordingly, the step 81 of forming a dielectric layer 13 may include a step 81*a*, which deposits the resin material (thermosetting resin) 43 that constructs the dielectric layer 13, and a step 81*b*, which cures the thermosetting resin 43, that are performed in a reduced pressure environment.

Next, in step 82, as depicted in FIG. 4(*b*), before the electrode layer 11 is formed, the patterning device 54 is used to perform patterning on the dielectric layer 13 to form margins (oil margins) 49, each of which separates one heavy edge portion 17 from the internal electrode part 15.

Next, in step 83, an electrode layer 11 is formed on the dielectric layer 13. In more detail, as depicted in FIG. 4(*c*), the first vapor deposition device 56 deposits the first metal 41 on the dielectric layer 13 through a metal mask 61 with a first pattern and thereby forms the electrode layer 11. The heavy edge portions (heavy edge parts) 16 and 17, where the connecting parts 18 that connect to the external electrodes 20 are thicker than the internal electrode part 15, are formed together with the internal electrode part 15 by the same metal and process as when the electrode layer 11 is formed. The first metal 41 may include aluminum or an alloy of aluminum. Although aluminum and an alloy of aluminum have a slightly higher resistivity (conductivity) compared to gold or copper, aluminum and aluminum alloys are favorable materials for constructing the internal electrode part 15 due to low cost, a relatively low boiling point, and ease of vapor deposition.

After this, in step 84, layers (layer portions, layer parts) of the edge support layer 12 are deposited on the heavy edge portions 16 and 17. In more detail, as depicted in FIG. 4(*d*), the second vapor deposition device 57 deposits the second metal 42 through the metal mask 62 with a second pattern in a limited region on the heavy edge portions 16 and 17 so as to form the layers as the edge support layer 12. The second metal 42 may include zinc or an alloy of zinc. The boiling point of zinc is 907° C., which is lower than 2520° C., the boiling point of aluminum. Accordingly, the vapor deposition device for zinc can be provided at lower cost than a vapor deposition device for aluminum, and the running cost can also be reduced. Although the resistivity of zinc is slightly higher than aluminum, it is also sufficiently low, so that zinc can be used as electrodes constructing the connecting parts (edge parts) 18 that connect to the external electrodes 20.

The oil patterning process depicted in FIG. 4(*b*) separates one heavy edge portion 17 as a dummy edge portion from the internal electrode part 15 as a process that precedes step 83, and in this process (step 84), the layer portions of the edge support layer 12 are formed on both the heavy edge portion 17 that is separated by the oil margin 49 and the heavy edge portion 16 that is not separated by the margin.

In step 85, the above processes are repeated until the number of laminated layers (stacked layers) reaches a predetermined value. By doing so, as depicted in FIG. 4(*e*), by repeating the steps in FIGS. 4(*a*) to 4(*d*), it is possible to manufacture a plurality of laminated structures (multi-layer bodies) in parallel, in each of which the dielectric layers 13 and the electrode layers 11 have been laminated so as to include the edge support layers 12 and possible to manufacture parts that function as the active layers 7 by cutting out at appropriate regions. In step 86, the manufacturing procedure advances to the next process for manufacturing the capacitor 1.

Figure 6:
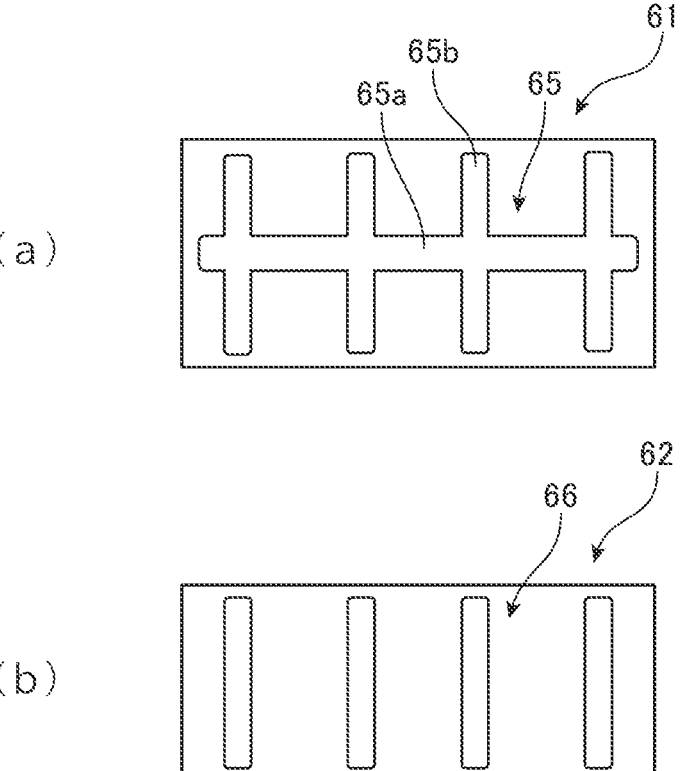
FIG. 6 depicts examples of metal masks.

In FIG. 6(*a*), one example of a metal mask 61 including a first pattern 65 for forming the electrode layer 11 including the heavy edge portions 16 and 17 is depicted. FIG. 6(*b*) depicts one example of a metal mask 62 including a second pattern 66 for forming the edge support layer 12 on the heavy edge portions 16 and 17. The pattern 65 of the metal mask 61 includes a first slit 65*a* that extends laterally in the center so as to form an internal electrode part 15, and second slits 65*b* that extend in a direction perpendicular to the slit 65*a* at regular intervals. The second slits 65*b* make it possible to increase the deposited amount at the edge portions with respect to the internal electrode part 15 formed by the first slit 65*a*. This means that heavy edge portions 16 and 17 that are thick compared to the internal electrode part 15 can be formed in the same process and at the same time.

On the other hand, if a heavy edge portion that is extremely thick relative to the internal electrode part 15 were simultaneously formed using this type of pattern 65, it would be necessary to extend the deposition time or to change the ratio between the areas of the first slit 65*a* and the second slits 65*b*. In either case, it becomes difficult to control the thickness of the internal electrode part 15, and as a result, the area ratio that functions as a capacitor is reduced and/or an appropriate thickness of layers cannot be achieved, which can make it impossible to obtain the desired capacitor performance. Accordingly, the thickness of the heavy edge portions 16 and 17 that can be formed with sufficient precision at the same time as the internal electrode part 15 is limited.

The pattern 66 for forming the edge support layer 12 is a pattern with linear (slit-like) openings at locations corresponding to the heavy edge portions 16 and 17 so that the second metal 42 is laminated in only the regions of the heavy edge portions 16 and 17, and has a simple shape, which makes it easy to control the thickness of the edge support layers 12. However, if a layer were formed with a thickness that satisfies the conditions of the edge portion using only this pattern 66, it would be difficult to control the width and thickness of the edge parts, and as a result, there is a risk that the desired capacitor performance may not be obtained. In the present embodiment, by combining the two patterns 65 and 66, it is possible to utilize the advantages of both patterns and optimally control the thickness and shape of the connecting parts 18. The number of patterns (masks) that are combined to form the edge parts is not limited to two and may be three or more.

As one example, if the connecting parts (edge portions) 18 where a thick layer is necessary were formed of zinc only, the thickness of the zinc metal must be increased to lower the resistance value of the connecting parts 18. If the zinc of the connecting parts 18 is made thicker, it is not possible to configure the connecting parts for the electrodes appropriately, which means that the connection resistance with the external electrode 20 increases and performance, such as ESR, deteriorates. When zinc is formed limitedly on only the connecting parts 18, lowering the vapor deposition resistance value for manufacturing on the drum 55 that rotates at high speed will increase the metal amount of deposition, which results in the problem that the slits in the mask are likely to clog. In other words, if the thick heavy edge portions 16 of aluminum or zinc are formed by vapor deposition of aluminum or zinc in a single deposition at a single location, the metal amount of vapor deposition will increase, resulting in a tendency for deposited metal to accumulate on the mask. When deposition is performed continuously under such condition, the opening areas of the mask may become smaller (thinner, slenderized). If manufacturing then continues further, the openings and/or slits in the mask may become clogged. By adding the step of forming the edge support layers 12, it becomes possible to reduce the metal amount of deposition performed by each vapor deposition source to increase the thickness of the heavy edge portions, which can suppress the risk of the openings and/or slits in a mask becoming clogged and can further improve the manufacturing efficiency and vapor deposition accuracy.

Another aluminum vapor deposition source or sources for achieving sufficient thickness for the connecting parts 18 may be installed separately from the aluminum vapor deposition source 56 for the active layers, that is, the internal electrode parts 15. But when a plurality of aluminum vapor deposition sources may be applied, compared to applying a zinc vapor deposition source 57, the cost of the layer film forming system would be extremely high and the equipment size would increase. In addition, the power consumption would increase, which increases the running cost. When connecting parts 18 with a predetermined thickness are formed together with the internal electrode parts 15 using the same mask, as described above, it is not easy to form connecting parts 18 that have the desired shape and thickness.

The layer film forming system 50 according to the present embodiment described above provides the connecting parts 18 that have the desired shape and thickness using both (in cooperation with) the heavy edge portions 16 and 17, which are made of aluminum using the aluminum vapor deposition source 56 for the active layers, and the edge support layers 12, which are made of zinc using a separate zinc vapor deposition source 57. By doing so, a desired edge resistance value for the connecting parts 18 can be obtained, and the connection resistance value for the connections with the external electrodes can be reduced. There is also no need to add another aluminum vapor deposition source, which greatly suppresses the cost and running cost of the layer film forming device 50. Also, by providing a plurality of vapor deposition sources 57 for forming the multiple layers for each edge support layer 12, it is possible to provide a capacitor in which the edge portions have been made thicker with higher accuracy.

Note that although specific embodiments of the present invention have been described above, various other embodiments and modifications will be conceivable to those of skill in the art without departing from the scope and spirit of the invention. Such other embodiments and modifications are addressed by the scope of the patent claims given below, and the present invention is defined by the scope of these patent claims.

The invention claimed is:

1. A capacitor comprising a main body, in which a dielectric layer film and an electrode layer film are repeatedly laminated, and an external electrode connected to at least a part of the main body, wherein the electrode layer film includes an internal electrode part and a heavy edge portion, the heavy edge portion being a connecting part, which connects to the external electrode and is thicker than the internal electrode part, and the capacitor further comprises an edge support layer film that includes at least one layer film that is made of metal and formed over at least one of a top surface and a bottom surface of the heavy edge portion of the electrode layer film, the edge support layer film being integrated with the heavy edge potion and increasing thickness of the connecting part, and the dielectric layer film, the electrode layer film and the edge support layer film being repeatedly laminated, and wherein the electrode layer film includes a first metal and the edge support layer film includes a second metal with a lower melting point and/or boiling point than the first metal.

2. The capacitor according to claim 1,
wherein the first metal and the second metal include at least one of aluminum, zinc, copper, gold, silver, and an alloy containing any of aluminum, zinc, copper, gold, and silver.

3. The capacitor according to claim 1,
wherein the first metal includes aluminum or an alloy of aluminum, and
the second metal includes zinc or an alloy of zinc.

4. The capacitor according to claim 1,
wherein the electrode layer film is a vapor deposition layer of the first metal on the dielectric layer film, and
the edge support layer film is a vapor deposition layer of the second metal on the heavy edge portion.

5. The capacitor according to claim 4,
wherein the main body includes a multi-layer part where:
a resin vapor deposition layer for forming the dielectric layer film;
a vapor deposition layer of the first metal for constructing the electrode layer film; and
a vapor deposition layer of the second metal for constructing the edge support layer film,
are repeatedly stacked in that order.

6. The capacitor according to claim 1,
wherein the dielectric layers film include thermosetting resin.

7. The capacitor according to claim 1,
wherein the dielectric layer film has a thickness of 0.1 μm to 1.5 μm.

8. The capacitor according to claim 1,
wherein the internal electrode part has a surface resistivity of 5 Ω/square to 80 Ω/square.

9. The capacitor according to claim 1,
wherein a combined surface resistivity of the heavy edge portion and the edge support layer film is 1 Ω/square to 20 Ω/square.

10. The capacitor according to claim 1,
wherein the electrode layer film includes the heavy edge portion that is separated from the internal electrode part, and
the edge support layer film includes a layer that is laminated on at least one of a top and a bottom of the separated heavy edge portion.

11. The capacitor according to claim 1,
further comprising a plurality of the edge support layer films.

12. A method of manufacturing a capacitor including a main body in which a dielectric layer film and an electrode layer film are repeatedly laminated, wherein at least part of the main body is connected to external electrodes, the method comprising forming an electrode layer film on a dielectric layer film, wherein the forming the electrode layer film includes forming an internal part and heavy edge portions, the heavy edge portions being connecting parts that connect to the external electrodes respectively and are thicker than the internal electrode part, and the method further comprises forming an edge support layer film that includes at least one layer film formed over a surface of the heavy edge portions of the electrode layer film, the edge support layer film being integrated with the heavy edge potion and increasing thickness of the connecting part, and the dielectric layer film, the electrode layer film and the edge support layer film being repeatedly laminated, wherein the electrode layer film includes a first metal and the edge support layer film includes a second metal with a lower melting point and/or boiling point than the first metal.

13. The method according to claim 12, further comprising forming the dielectric layer film, wherein the forming the dielectric layer film includes vapor deposition of a resin material that constructs the dielectric layer film in a reduced pressure environment, the forming the electrode layer film includes vapor deposition of the first metal, which constructs the electrode layer film, on the dielectric layer film, and the forming the edge support layer film includes vapor deposition of the second metal.

14. The method according to claim 13, further comprising curing the resin, which is thermosetting, following the vapor deposition of the resin material.

15. The method according to claim 13, wherein the vapor deposition of the first metal includes vapor deposition using a first pattern metal mask, and the vapor deposition of the second metal includes vapor deposition using a second pattern metal mask that differs from the first pattern metal mask.

16. The method according to claim 13, wherein the first metal includes aluminum or an alloy of aluminum, and the second metal includes zinc or an alloy of zinc.

17. The method according to claim 12, further comprising patterning a margin, which separates one of the heavy edge portions from the inner electrode part, on the dielectric layer film before the forming of the electrode layer film, and wherein the forming of the edge support layer film includes forming the at least one layer film on each of the heavy edge portions, one that is separated by the margin and the other that is not separated by the margin.

18. A system for manufacturing a capacitor including a main body, in which a dielectric layer film and an electrode layer film are repeatedly laminated, wherein at least part of the main body is connected to an external electrode, the system comprising:

a chamber that provides a reduced pressure environment;

a transferring device that transfers workpiece for the main body during manufacturing inside the chamber;

a dielectric layer film forming device that forms the dielectric layer film on the workpiece;

an electrode layer film forming device that forms the electrode layer film on the dielectric layer film together with heavy edge portions with connecting parts that connect to the external electrode and are thicker than an internal electrode part, the dielectric layer film forming device and the electrode layer film forming device being disposed along the transferring device inside the chamber; and at least one edge support layer film forming device that is disposed along the transferring device inside the chamber and forms an edge support layer film over a surface of the heavy edge portions of the electrode layer film, the edge support layer film being integrated with the heavy edge potion and increasing thickness of the connecting part, and the dielectric layer film, the electrode layer film and the edge support layer film being repeatedly laminated, and wherein the electrode layer film includes a first metal and the edge support layer film includes a second metal with a lower melting point and/or boiling point than the first metal.

19. The system according to claim 18, wherein the dielectric layer film forming device includes a device that performs vapor deposition of a resin material that constructs the dielectric layer film in the reduced pressure environment, the electrode layer film forming device includes a device that performs vapor deposition of the first metal, which constructs the electrode layer film, on the dielectric layer film in the reduced-pressure environment, and the edge support layer film forming device includes a device that performs vapor deposition of the second metal in the reduced pressure environment.

20. The system according to claim 19, further comprising a device that cures the resin material, which is thermosetting, and is disposed along the transferring device inside the chamber.

21. The system according to claim 19, wherein the device that performs vapor deposition of the first metal includes a metal mask of a first pattern, and the device that performs vapor deposition of the second metal includes a metal mask with a second pattern that differs from the first pattern.

22. The system according to claim 18, further comprising a patterning device, disposed between the dielectric layer film forming device and the electrode layer film forming device along the transferring device inside the chamber, that performs patterning on the dielectric layer film to form a margin, which separates one of the heavy edge portions from the internal electrode part.

23. The system according to claim 18, further comprising a plurality of the edge support layer film forming devices.

* * * * *